US012663702B2

(12) United States Patent
Yeh et al.

(10) Patent No.: US 12,663,702 B2
(45) Date of Patent: Jun. 23, 2026

(54) OPTICAL ENGINE MODULE AND PROJECTION APPARATUS

(71) Applicant: Coretronic Corporation, Hsin-Chu (TW)

(72) Inventors: Cheng-Yu Yeh, Hsin-Chu (TW); Tung-Chou Hu, Hsin-Chu (TW); Wen-Yen Chung, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 692 days.

(21) Appl. No.: 17/976,863

(22) Filed: Oct. 30, 2022

(65) Prior Publication Data

US 2023/0161235 A1    May 25, 2023

(30) Foreign Application Priority Data

Nov. 25, 2021    (CN) .......................... 202111412224.X

(51) Int. Cl.
*G03B 21/16* (2006.01)
*G02B 7/00* (2021.01)
*G02B 7/02* (2021.01)
*G02B 27/28* (2006.01)

(52) U.S. Cl.
CPC ............. *G03B 21/16* (2013.01); *G02B 7/008* (2013.01); *G02B 27/286* (2013.01); *G02B 7/021* (2013.01); *G02B 7/022* (2013.01); *G02B 7/023* (2013.01)

(58) Field of Classification Search
CPC ...... G03B 21/16; G03B 7/008; G03B 27/286; G03B 27/021; G03B 27/022; G03B 27/023

USPC .......................................................... 353/20
See application file for complete search history.

(56) References Cited

U.S. PATENT DOCUMENTS

2020/0159095 A1* 5/2020 Chen .................... G03B 21/145

FOREIGN PATENT DOCUMENTS

| CN | 1743947 | | | 3/2006 | |
|----|---------|---|---|--------|---|
| CN | 1743947 | A | * | 3/2006 | |
| CN | 101344644 | A | * | 1/2009 | ........... G02B 27/285 |
| CN | 104202252 | | | 12/2014 | |
| CN | 207689817 | | | 8/2018 | |
| CN | 108518644 | | | 9/2018 | |
| CN | 108847441 | | | 11/2018 | |
| CN | 209044286 | | | 6/2019 | |

(Continued)

OTHER PUBLICATIONS

Translation of CN101344644 (Year: 2025).*

(Continued)

*Primary Examiner* — Jerry L Brooks
(74) *Attorney, Agent, or Firm* — JCIPRNET

(57) ABSTRACT

An optical engine module and a projection apparatus are provided. The optical engine module is adapted for a projection apparatus. The optical engine module includes a casing, an optical element, a fixing member, and a heat dissipation fin group. The optical element is disposed in the casing. The optical element has a first surface, a second surface, and a plurality of side surfaces. Each of the side surfaces is adjacent between the first surface and the second surface. The fixing member is disposed on at least one of the side surfaces of the optical element, and is configured to fix the optical element in the casing. The heat dissipation fin group is disposed on the fixing member and extends out of the casing.

10 Claims, 5 Drawing Sheets

(56)    References Cited

FOREIGN PATENT DOCUMENTS

| | | | | | |
|---|---|---|---|---|---|
| CN | 110017306 | | 7/2019 | | |
| CN | 209267722 | | 8/2019 | | |
| CN | 210119618 | U * | 2/2020 | | |
| CN | 111198471 | | 5/2020 | | |
| CN | 211015252 | | 7/2020 | | |
| CN | 213338638 | | 6/2021 | | |
| CN | 214122663 | U * | 9/2021 | | |
| CN | 115903350 | | 4/2023 | | |
| EP | 3273283 | A1 * | 1/2018 | ......... | G02F 1/13362 |
| JP | 2004239948 | A * | 8/2004 | | |
| KR | 20060068134 | | 6/2006 | | |
| WO | WO-2021109783 | A1 * | 6/2021 | ............ | G03B 21/16 |

OTHER PUBLICATIONS

Translation of JP2004239948 (Year: 2025).*
Translation of CN_210119618_U (Year: 2025).*
Translation of EP_3273283_A1 (Year: 2025).*
Translation of WO_2021109783_A1(Year: 2025).*
Translation of CN_101344644_A (Year: 2025).*
Translation of CN 1743947 (Year: 2025).*
"Office Action of China Counterpart Application", issued on Jul. 16, 2025, p. 1-p. 12.

* cited by examiner

OPTICAL ENGINE MODULE AND PROJECTION APPARATUS

CROSS-REFERENCE TO RELATED APPLICATION

This application claims the priority benefit of Chinese application no. 202111412224.X, filed on Nov. 25, 2021. The entirety of the above-mentioned patent application is hereby incorporated by reference herein and made a part of this specification.

BACKGROUND

Technical Field

The disclosure relates to an optical engine module and a projection apparatus.

Description of Related Art

A projection apparatus is a display device configured to generate large-size images. The imaging principle of the projection apparatus is to convert an illumination light beam generated by a light source into an image light beam with an optical engine module, and then project the image light beam onto a screen or a wall surface through a lens module. During the above process, relevant optical elements involved in beam conversion are also accompanied by accumulation of heat. Therefore, how to provide effective heat dissipation for the optical elements has become an important issue in projection technology.

Current heat dissipation means mostly provide cooling airflow to blow a casing of the optical engine module, but heat dissipation effects thereof on the optical elements disposed in the casing are limited. Another heat dissipation means is to blow the cooling airflow directly toward the optical elements in the casing, which can directly dissipate the optical elements, but is accompanied by destruction of dust tightness of the optical engine module in the casing. Thus, dust and even foreign objects from the external environment are likely to be brought in by the airflow and cause damage to the optical elements.

Based on the above-mentioned heat dissipation means, relevant issues may still arise. Therefore, how to provide an improved heat dissipation means for the projection apparatus and the optical engine module therein is actually an issued to be taken into consideration by those skilled in the related fields.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides an optical engine module and a projection apparatus, in which a fixing member and a heat dissipation fin group is disposed on at least one side surface of an optical element disposed in the optical engine module, and the heat dissipation fin group extends out of the casing, so that heat can be smoothly dissipated from the optical engine module.

Other objectives and advantages of the disclosure may be further understood from the technical features disclosed in the disclosure.

To achieve one, some, or all of the above-mentioned objectives or other objectives, an embodiment of the disclosure provides an optical engine module adapted for a projection apparatus. The optical engine module includes a casing, an optical element, a fixing member, and a heat dissipation fin group. The optical element is disposed in the casing. The optical element has a first surface, a second surface, and a plurality of side surfaces. Each of the side surfaces is adjacent between the first surface and the second surface. The fixing member is disposed on at least one of the side surfaces of the optical element, and is configured to fix the optical element. The fixing member and the optical element are fixed in the casing. The heat dissipation fin group is disposed on the fixing member and extends out of the casing.

To achieve one, some, or all of the above-mentioned objectives or other objectives, an embodiment of the disclosure provides a projection apparatus including a light source, an optical engine module, and a lens module. The light source is configured to provide an illumination light beam. The optical engine module is configured to convert the illumination light beam into an image light beam. The lens module is configured to project the image light beam. The optical engine module includes a casing, an optical element, a fixing member, and a heat dissipation fin group. The optical element is disposed in the casing. The optical element has a first surface, a second surface, and a plurality of side surfaces. Each of the side surfaces is adjacent between the first surface and the second surface. The fixing member is disposed on at least one of the side surfaces of the optical element, and is configured to fix the optical element. The fixing member and the optical element are fixed in the casing. The heat dissipation fin group is disposed on the fixing member and extends out of the casing.

Based on the foregoing, in the optical engine module of the projection apparatus, the fixing member is disposed on at least one side surfaces of the optical element. In addition, both the fixing member and the optical element are disposed in the casing of the optical engine module. Then, the heat dissipation fin group is disposed on the fixing member and extends from the fixing member out of the casing. Accordingly, heat accumulated by light conversion of the optical element can smoothly pass through the heat dissipation fin group and be dissipated out of the casing of the optical engine module, which can thus provide effective heat dissipation means for the optical engine module when accompanied with heat dissipation components of the projection apparatus.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

Figure 1:
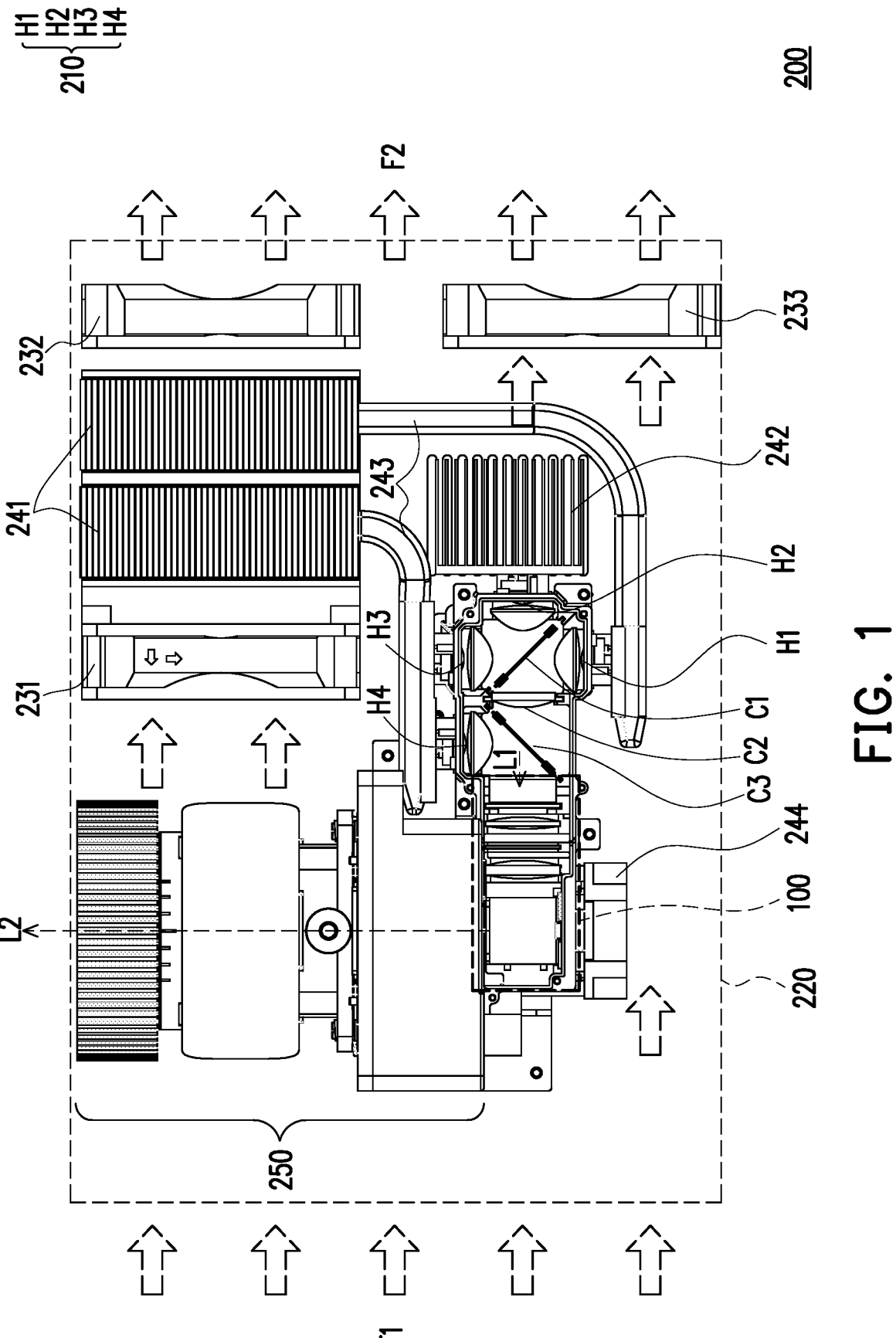

FIG. 1 is a top view of a projection apparatus according to an embodiment of the disclosure.

Figure 2:
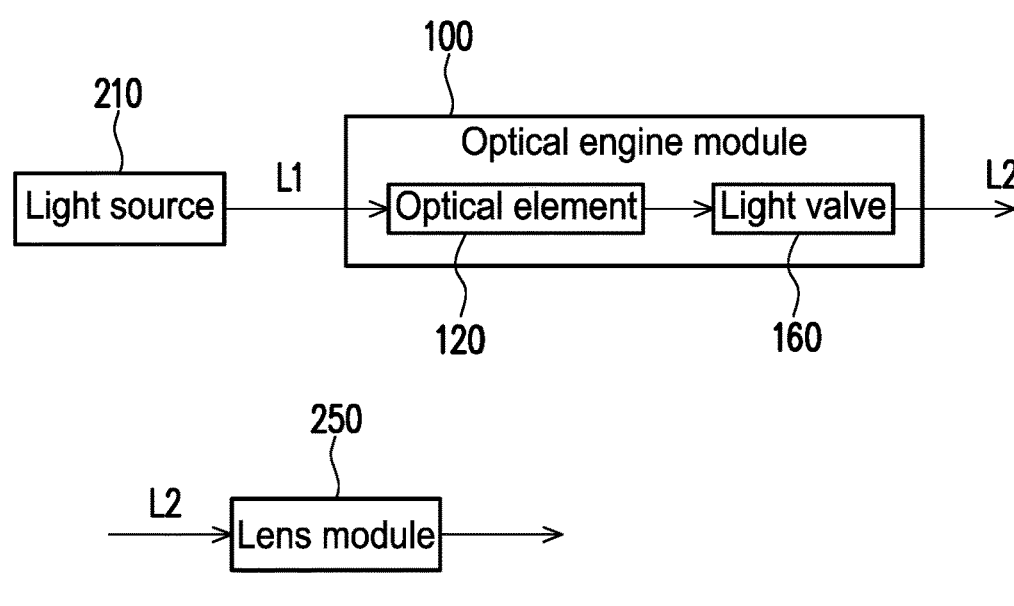

FIG. 2 is a simple block diagram of an optical system of the projection apparatus of FIG. 1.

Figure 3:
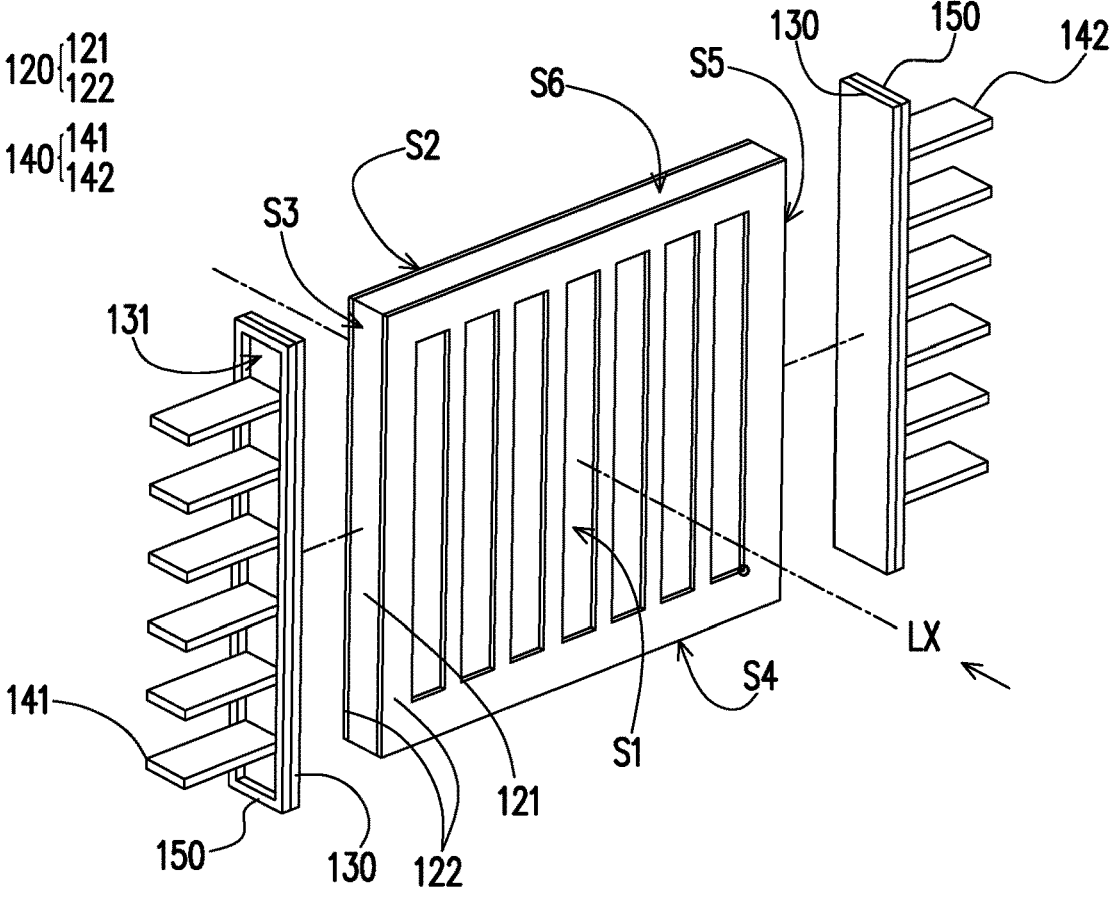

FIG. 3 is an exploded view of an optical element.

Figure 4:
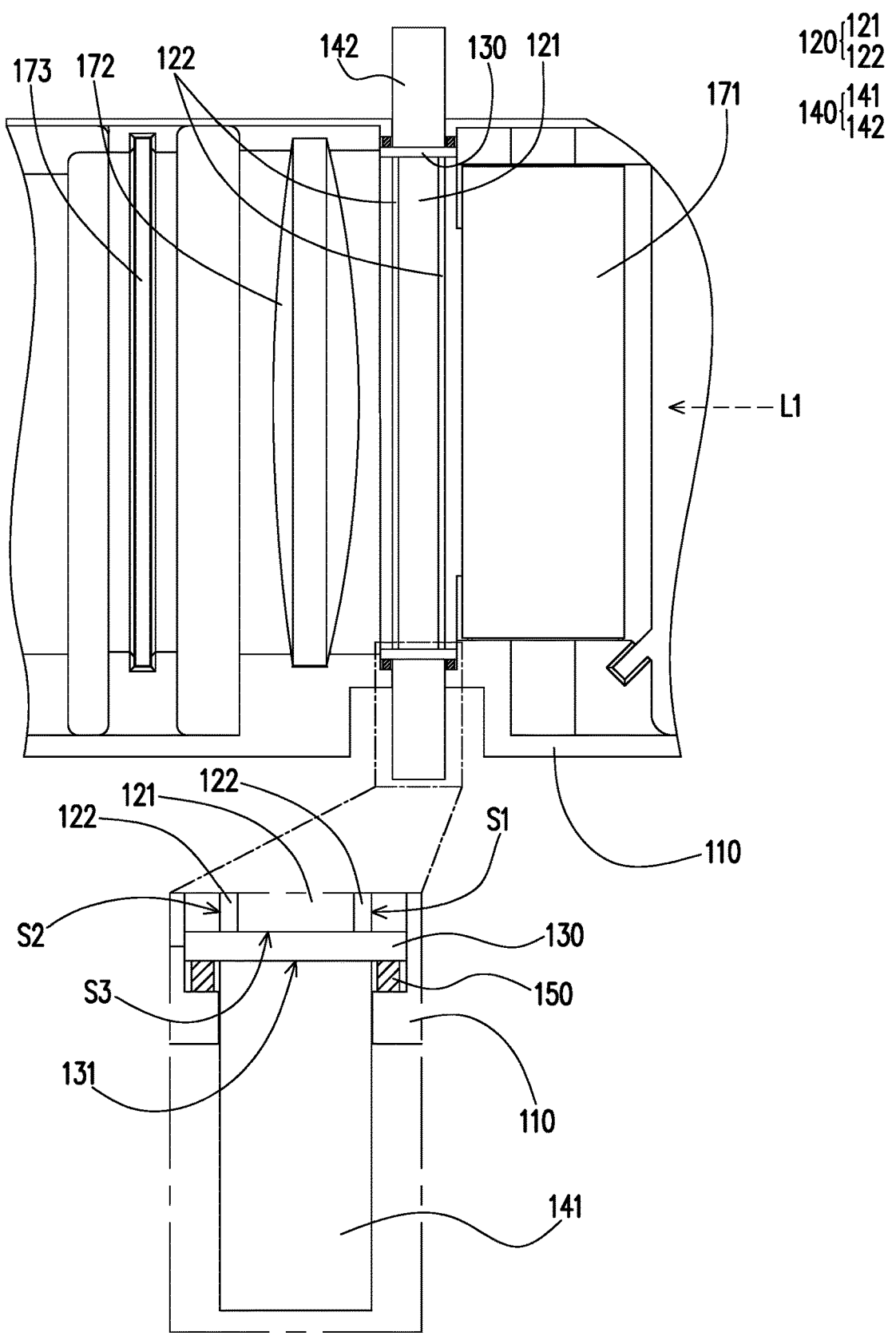

FIG. 4 is a partial top view of the optical engine module of FIG. 1.

Figure 5:
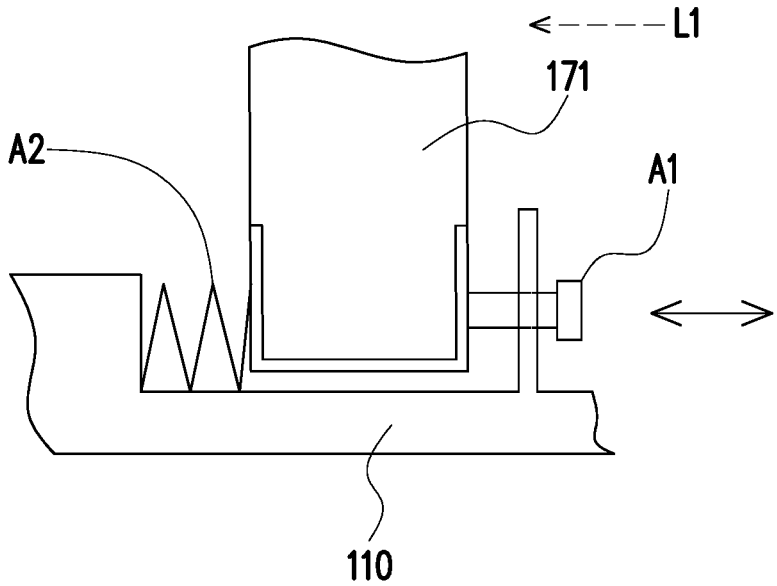

FIG. 5 is a simple schematic diagram of another optical element in the casing.

Figure 6:
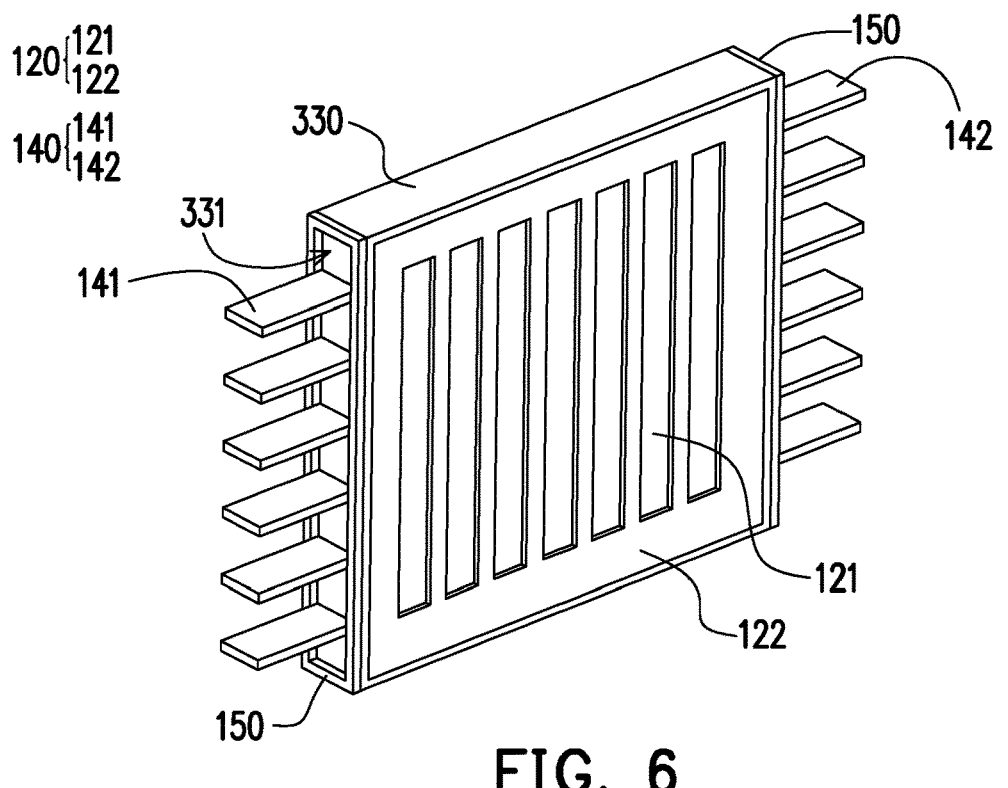
Figure 7:
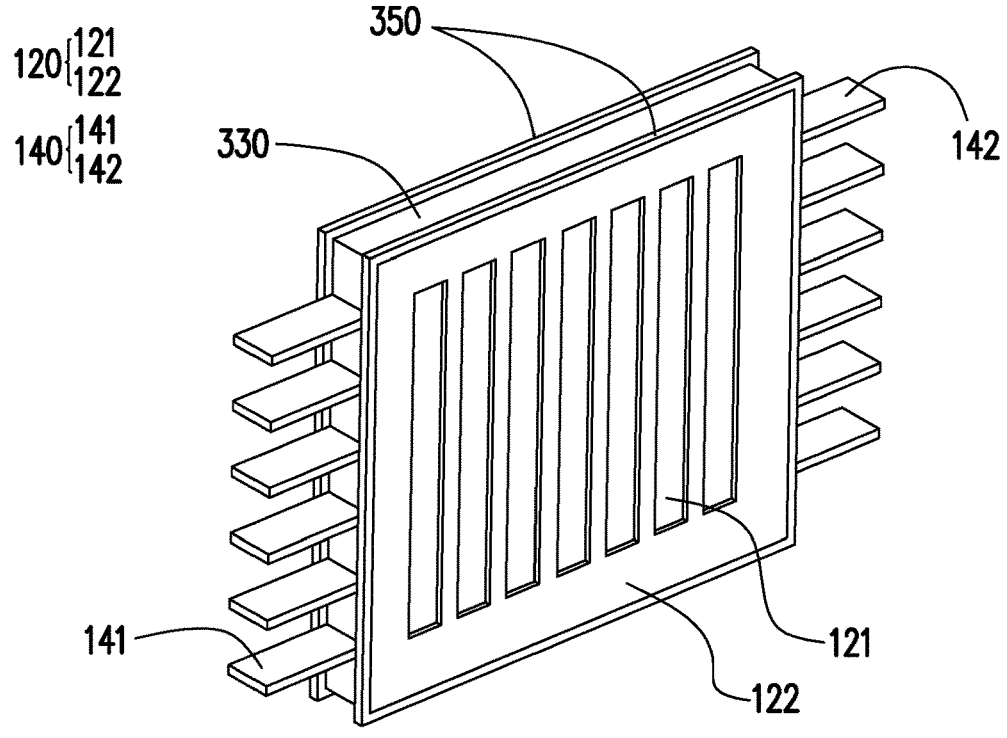

FIG. 6 and FIG. 7 are respectively schematic diagrams of optical elements according to different embodiments.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

FIG. 1 is a top view of a projection apparatus according to an embodiment of the disclosure, where some members are omitted so that the configuration state of the optical system inside the projection apparatus can be clearly identified. FIG. 2 is a simple block diagram of an optical system of the projection apparatus of FIG. 1. With reference to FIG. 1 and FIG. 2 together, in this embodiment, a projection apparatus 200 includes an apparatus casing 220 and a light source 210, an optical engine module 100, and a lens module 250 disposed in the apparatus casing 220. The light source 210 is configured to provide an illumination light beam L1. The optical engine module 100 is configured to convert the illumination light beam L1 into an image light beam L2, so that the lens module 250 may adjust the image light beam L2 and then project the image light beam L2 out of the projection apparatus 200.

As shown in FIG. 1, the light source 210 includes four light-emitting elements H1, H2, H3, and H4 and light combining elements C1, C2, and C3. The light combining elements C1 and C3 include, for example, a dichroic mirror, and the light combining element C2 includes, for example, a condenser lens element, but other embodiments are not limited thereto. It can be understood that the positions and structures of the light combining elements C1, C2, and C3 in the figure only serve as examples, and are not limited by the disclosure. In this embodiment, light beams generated by the four light-emitting elements H1, H2, H3, and H4 are transmitted to the light combining elements C1, C2, and C3 to be combined into the illumination light beam L1. In this embodiment, the light-emitting element H1 may be, for example, a green light-emitting module. The light-emitting element H2 may be, for example, a blue light-emitting diode (LED). The light-emitting element H3 may be, for example, a blue light-emitting diode. The light-emitting element H4 may be, for example, a red light-emitting diode. The green light-emitting module of the light-emitting element H1 may include a blue light-emitting diode and a phosphor powder layer. The phosphor powder layer may be disposed between the blue light-emitting diode of the light-emitting element H1 and the light combining element C1, and the phosphor powder layer may convert blue light into green light. One side of the phosphor powder layer receives a blue light beam generated by the blue light-emitting diode of the light-emitting element H1, and the other side of the phosphor powder layer receives a blue light beam generated by the light-emitting element H3 and converts the blue light beams into a green light beam. As such, intensity of the green light beam can be increased.

Then, the optical engine module 100 includes a plurality of optical elements 120 and a light valve 160. The optical engine module 100 receives the illumination light beam L1 generated by the light source 210, and the plurality of optical elements 120 and the light valve 160 of the optical engine module 100 are adapted to convert the illumination light beam L1 into the image light beam L2. Further, as referred to in this embodiment, the optical element 120 is a polarization converter, while the light valve 160 may include a liquid crystal on silicon (LCoS) panel or a transmissive liquid crystal panel. Accordingly, the illumination light beam L1 passing through the optical elements 120 may be incident to a polarizing beam splitter (PBS, not shown), may be reflected by the polarizing beam splitter to the light valve 160, and may then be reflected by the light valve 160 and pass through the polarizing beam splitter to form the image light beam L2 to be transmitted to the lens module 250. Here, the polarization direction of the light beam is changed after the light beam is reflected by the light valve 160, so the light beam reflected by the light valve 160 can pass through the polarizing beam splitter. In another embodiment, it is also possible to dispose an optical wave plate to change the polarization direction of the light beam. The architecture of the light valve 160 is not limited to that shown in this embodiment.

As mentioned above, the process of light beam conversion of the optical system causes heat to be accumulated on the optical element, so it is necessary to further provide corresponding heat dissipation countermeasures.

FIG. 3 is an exploded view of an optical element. FIG. 4 is a partial top view of the optical engine module of FIG. 1, which focuses on the optical engine module 100, and particularly on the optical element 120. With reference to FIG. 1, FIG. 3, and FIG. 4, the optical engine module 100 of this embodiment further includes a casing 110, a fixing member 130, and a heat dissipation fin group 140. The optical element 120 is exemplified by a polarization converter, which includes an optical element body 121 and metal gratings 122. The optical element 120 is disposed in the casing 110. The optical element 120 has an optical axis LX, a first surface S1, a second surface S2, and a plurality of side surfaces S3 to S6. Each of the side surfaces S3 to S6 is adjacent between the first surface S1 and the second surface S2. Here, the first surface S1 is the light-incident surface of the optical element 120, and the second surface S2 is the light-emitting surface of the optical element 120. The fixing member 130 (e.g., metal or heat dissipation material) is disposed on the side surfaces S3 and S5 of the optical element 120, and is configured to fix the optical element 120 in the casing 110. The heat dissipation fin group 140 is disposed on the fixing member 130 and extends out of the casing 110.

To be specific, the heat dissipation fin group 140 includes a plurality of fins 141 and 142 extending from a base surface 131 (e.g., parallel to the side surfaces S3 and S5) of the fixing member 130. Each of the fins 141 and 142 extends away from the optical element 120 and extend out of the casing 110 (e.g., an extension direction of the fins 141 and 142 is parallel to a normal of the side surfaces S3 and S5). As mentioned above, the optical element 120 of this embodiment exemplified by a polarization converter, which includes the optical element body 121 and a pair of metal gratings 122. One of the pair of metal gratings 122 is disposed on one side of the optical element body 121 to form the first surface S1, and the other of the pair of metal gratings 122 is disposed on the other side of the optical element body 121 to form the second surface S2. In view of this, in this embodiment, the pair of metal gratings 122, the fixing member 130, and the heat dissipation fin group 140 may be further manufactured with metal materials into an integrally formed structure, which helps to simplify the manufacturing process and increase the structural strength.

Moreover, the optical engine module 100 further includes a soft member 150. The soft member 150 is disposed on the fixing member 130 and abuts between the fixing member 130 and the casing 110 (e.g., the base surface 131 and an inner surface of the casing 110). In the meantime, two soft members 150 are shown respectively surrounding the fins 141 and 142. Therefore, when assembled to the casing 110, the soft member 150 may serve as a sealing member to maintain sealability of a space where the optical element 120 is located in the casing 110. In other words, with the soft member 150 serving as a structure isolating the inner and outer spaces of the casing 110, the fixing member 130 and the optical element 120 can be maintained in the casing 110, exposing only the fins 141 and 142 out of the casing 110. Accordingly, dust tightness of the optical engine module 100 inside the casing 110 can be ensured.

In addition, with reference to FIG. 1, the projection apparatus 200 of this embodiment also includes a plurality of fans 231, 232, and 233, a plurality of heat dissipation fin groups 241, 242, and 244, and a heat pipe 243, to accordingly provide heat dissipation in the apparatus casing 220. The apparatus casing 220 of this embodiment has a corresponding opening (not shown), and airflow is thus generated by the operation of the fans 231, 232, and 233. Further, an airflow F1 from the external environment with a relatively low temperature is drawn into the apparatus casing 220 and travels through the heat dissipation fin groups 241, 242, and 244, the heat pipe 243, and the members disposed in the apparatus casing 220 to exchange heat to form an airflow F2. Then, the airflow F2 with a high temperature is discharged out of the apparatus casing 220. From the above, the required heat dissipation is achieved.

More importantly, due to the configuration relationship between the optical element 120, the fixing member 130, and the heat dissipation fin group 140 relative to the casing 110 in the optical engine module 100, the airflow generated by the fans 231, 232, and 233 in the apparatus casing 220 also dissipates heat from the heat dissipation fin group 140 that extends out of the casing 110 of the optical engine module 100, while the sealability in the casing 110 is also maintained.

FIG. 5 is a simple schematic diagram of another optical element in the casing. With reference to FIG. 5, it should also be mentioned in this embodiment that, in order to provide heat dissipation for the optical element 120, the optical element 120 and the fixing member 130 are thus fixed together in the casing 110, and the heat dissipation fin group 140 extends out of the casing 110 to serve for heat dissipation. Therefore, there is no significant heat accumulation for other optical elements of the optical engine module 100, particularly those that are not involved with light beam conversion, so they may be accordingly changed to be movably assembled in the casing 110 to serve to compensate for tolerances of member assembly and adjust the light path. Here, an optical element 171 is taken as an example, which is, for example, a lens element array, which is located before the optical element 120 on the light path of the illumination light beam L1 generated by the light source 210. Here, in the axial direction of transmission of the light beam, an elastic member A2 is disposed one side of the optical element 171, so that the optical element 171 abuts the casing 110 via the elastic member A2, and an adjusting member A1 (e.g., a screw) is disposed on the other side of the optical element 171, and is movably screwed to a rib structure of the casing 110 and abuts the optical element 171. Accordingly, when mounting the optical element 171, a user can adjust the position of the optical element 171 on the light path through the relative action of the elastic member A2 and the adjusting member A1, as indicated by the adjustment axis shown by the double arrow in FIG. 5.

From the above, it can be further understood that, in order to effectively reduce the heat generated by the optical engine module 100, a corresponding heat dissipation structure such as the optical element 120 may be provided for those performing light beam conversion and may be fixed in the casing 110. In terms of the assembly process, configuration of optical elements (e.g., the optical element 171) without significant heat accumulation is changed to a movable and adjustable state, so that the optical engine module 100 can meet the requirements of both assembly accuracy and heat dissipation. In other words, two other optical elements 172 and 173 as shown in FIG. 4 can provide different corresponding means according to the above conditions, so that the optical engine module 100 can meet the above requirements.

FIG. 6 and FIG. 7 are respectively schematic diagrams of optical elements according to different embodiments. With reference to FIG. 6 in comparison with FIG. 3, those with the same reference numerals or with no reference numerals in FIG. 6 and in FIG. 3 have the same structural features as. Different from the above embodiments, in this embodiment, a plurality of fixing members similar to the fixing member 130 covers the side surfaces S3 to S6 of the optical element 120 to form a frame 330, which facilitates the convenience of assembly of the optical element 120 and the casing 110. In addition, the frame 330 is taken as the protective structure of the optical element 120. In the meantime, in this embodiment, two of base surfaces 331 (equivalent to a left base surface and a right base surface, with only the left base surface being labeled here) of the frame 330 serve for forming the heat dissipation fins 141 and 142. In another embodiment not shown, the frame 330 may also have two other base surfaces, namely an upper base surface and a lower base surface, for forming heat dissipation fins for heat dissipation. It should be noted that the shape of the optical element is not limited by this embodiment. The optical element 120 of the above embodiments has a rectangular cuboid shape and thus has the four side surfaces S3 to S6. In another embodiment not shown, when the optical element is, for example, a circular lens element, a fixing member that matches the shape of the optical element may still be provided, and a plurality of fins extending from the fixing member may be formed, to achieve heat dissipation similar to that of the above embodiments. In brief, any fixing member may be applied to this embodiment as long as the provided fixing member is suitable for forming fins thereon extending away from the optical axis of the optical element.

With reference to FIG. 7 in comparison with FIG. 3, different from the above embodiments, this embodiment not only includes the frame 330 of the above embodiment, but also provides a soft member 350. In addition, the soft member 350 not only surrounds the fins 141 and 142 on the fixing member 130, but also extends through all the base surfaces of the frame 330. In other words, the optical element 120 can abut the casing 110 entirely through the surrounding soft member 350, and maintains the sealability of the space where the optical element 120 is located in the casing 110.

In summary of the foregoing, in the above embodiment of the disclosure, in the optical engine module of the projection apparatus, the fixing member is disposed on at least one side surfaces of the optical element. In addition, both the fixing member and the optical element are disposed in the casing of the optical engine module. Then, the heat dissipation fin group is disposed on the fixing member and extends from the fixing member out of the casing. Accordingly, heat accumulated by light conversion of the optical element can smoothly pass through the heat dissipation fin group and be dissipated out of the casing of the optical engine module, which can thus provide effective heat dissipation means for the optical engine module when accompanied with heat dissipation components of the projection apparatus.

In other words, a designer may appropriately adjust the relevant structural design depending on the heat generation state of the optical engine module. In other words, the structural configuration of the fixing member and the heat dissipation fin group described in the disclosure may be applied to the optical element that shows obviously heat accumulation and needs heat dissipation, while those without obvious heat accumulation may be adjusted to be movably assembled, so that the optical engine module and the projection apparatus using the optical engine module can meet the requirements of assembly accuracy and heat dissipation.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An optical engine module adapted for a projection apparatus, wherein the optical engine module comprises:

a casing having a space;

an optical element entirely disposed in the space of the casing, wherein the optical element has a first surface, a second surface, and a plurality of side surfaces, and each of the side surfaces is adjacent between the first surface and the second surface;

a fixing member covering the side surfaces of the optical element to form a frame of the optical element, and configured to fix the optical element in the casing, wherein the frame has a plurality of base surfaces facing away from the optical element;

a heat dissipation fin group disposed on the fixing member, wherein the heat dissipation fin group comprises a plurality of fins extending from at least one of the base surfaces of the frame, and each of the plurality of fins extends away from the optical element and out of the casing; and a soft member surrounding the plurality of fins on the fixing member and continuously disposed around the base surfaces, wherein the soft member abuts between the frame and the casing to maintain sealability of the space where the optical element is located in the casing.

2. The optical engine module as claimed in claim 1, wherein the optical element is a polarization converter, the polarization converter comprises an optical element body and a pair of metal gratings, one of the pair of metal gratings is disposed on one side of the optical element body to form the first surface, and the other of the pair of metal gratings is disposed on the other side of the optical element body to form the second surface.

3. The optical engine module as claimed in claim 2, wherein the pair of metal gratings, the fixing member, and the heat dissipation fin group are an integrally formed structure.

4. The optical engine module as claimed in claim 1, wherein an extension direction of the heat dissipation fin group is away from an optical axis of the optical element.

5. The optical engine module as claimed in claim 1, further comprising another optical element located before the optical element on a light beam transmission path, wherein the optical element is fixed in the casing, and the another optical element is movably assembled in the casing.

6. A projection apparatus, comprising:

a light source configured to provide an illumination light beam;

an optical engine module configured to convert the illumination light beam into an image light beam; and a lens module configured to project the image light beam, wherein the optical engine module comprises:

a casing having a space;

an optical element entirely disposed in the space of the casing, wherein the optical element has a first surface, a second surface, and a plurality of side surfaces, and each of the side surfaces is adjacent between the first surface and the second surface;

a fixing member covering the side surfaces of the optical element to form a frame of the optical element, and configured to fix the optical element in the casing, wherein the frame has a plurality of base surfaces facing away from the optical element;

a heat dissipation fin group disposed on the fixing member, wherein the heat dissipation fin group comprises a plurality of fins extending from at least one of the base surfaces of the frame, and each of the plurality of fins extends away from the optical element and out of the casing; and a soft member surrounding the plurality of fins on the fixing member and continuously disposed around the base surfaces, wherein the soft member abuts between the frame and the casing to maintain sealability of the space where the optical element is located in the casing.

7. The projection apparatus as claimed in claim 6, wherein the optical element is a polarization converter, the polarization converter comprises an optical element body and a pair of metal gratings, one of the pair of metal gratings is disposed on one side of the optical element body to form the first surface, and the other of the pair of metal gratings is disposed on the other side of the optical element body to form the second surface.

8. The projection apparatus as claimed in claim 7, wherein the pair of metal gratings, the fixing member, and the heat dissipation fin group are an integrally formed structure.

9. The projection apparatus as claimed in claim 6, wherein an extension direction of the heat dissipation fin group is away from an optical axis of the optical element.

10. The projection apparatus as claimed in claim 6, wherein the optical engine module further comprises another optical element located before the optical element on a light beam transmission path, wherein the optical element is fixed in the casing, and the another optical element is movably assembled in the casing.

\* \* \* \* \*